United States Patent [19]

Klebanoff

[11] 4,197,992
[45] Apr. 15, 1980

[54] THERMOSTAT CONTROL DEVICE

[76] Inventor: Leonard Klebanoff, 33 Blue Ridge Rd., Willowdale, Ontario, Canada, M2K 1R8

[21] Appl. No.: 934,870

[22] Filed: Aug. 18, 1978

Related U.S. Application Data

[63] Continuation-in-part of Ser. No. 850,938, Nov. 14, 1977, abandoned.

[51] Int. Cl.² .................. F23N 5/20; G05D 23/00
[52] U.S. Cl. ...................... 236/46 R; 236/47; 307/39; 361/190
[58] Field of Search .......... 236/46 R, 47; 165/12; 307/39; 361/190

[56] References Cited

U.S. PATENT DOCUMENTS

| | | | |
|---|---|---|---|
| 3,599,863 | 8/1971 | Pinckaers | 236/46 R |
| 3,891,144 | 6/1975 | Sadler et al. | 236/47 |
| 3,948,441 | 4/1976 | Perkins et al. | 236/47 |

*Primary Examiner*—William E. Wayner
*Attorney, Agent, or Firm*—Fetherstonhaugh & Co.

[57] ABSTRACT

This invention is for controlling the energization of a furnace, air conditioner or the like that has two thermostats, one to control the upper temperature limit and the other to control the lower temperature limit. A manually settable programming means is provided that is operable on a continuous basis from the voltage across thyristor devices associated with the thermostats which control the on-off condition of the furnace. The programming device devides time into slots and has a switching means that enables a thyristor of a selected one of control paths to conduct when its respective thermostat is closed and to disenable the thyristor of the other control path from conducting in any predetermined time slot. Power for operating the programming device is obtained from the voltage across the thyristors when they are conducting and when they are non-conducting.

4 Claims, 6 Drawing Figures

THERMOSTAT CONTROL DEVICE

This application is a continuation in part application of Application Ser. No. 850,938, now abandoned, filed on Nov. 14, 1977.

This invention relates to an improvement in a device for programming a thermostat for a furnace or for an air conditioner. In recent years, with the increased emphasis on energy conservation, it has become more important to investigate all methods of minimizing consumption of energy in all facets of daily life. In particular, great improvements in efficiency can be realized in the heating and cooling of residences. This area is of concern since, in general, a very significant amount of our available energy is used in heating and cooling residences at times when personal comfort does not demand the amount of heating or cooling that is supplied. Greater economies can be achieved by proper programming of a household thermostat than can be most practical insulation techniques. The purpose of this invention is to provide a low cost programmable thermostat that is easily installed in the average home and that can easily be programmed by the householder. It should be mentioned that practical devices of this type do presently exist on the market, but they are relatively expensive due to the techniques used. The improvement to devices of this kind described herein avoids these problems and provides a more practical and less expensive device. The end cost to the consumer is of primary importance here since the acceptance of a device is largely determined by its affordability to the general public.

The common domestic household heating furnace is controlled by a room thermostat located in the room whose temperature is to be controlled and a furnace relay located close to the furnace. Power for the relay is supplied through an isolation transformer that steps the normal 60 cycle 117 volt AC power supply down to 60 cycle 24 volt AC. The thermostat and the coil of the furnace relay are usually connected in series with the output side of the stepdown isolation transformer. When no heat is called for, there is an open circuit at the thermostat and the 24 volt output of the transformer appears at the terminals of the thermostat. When the temperature drops to the point where the thermostat contacts close, there is a short circuit across the thermostat and the full voltage of the isolation transformer output appears across the relay coil to operate the furnace but no voltage across the shorted thermostat.

As indicated this invention relates to an improvement in a device for programming the thermostat. Commonly, these devices have two thermostats, one set for a high temperature and the other set for a low temperature and a programming device for rendering the high temperature thermostat operative during certain periods of the day and the low temperature thermostat operative for other periods of the day. These devices require power for operation and it is desirable to derive the power from the two wires at the thermostat that come from the power supply transformer and relay. To be able to supply power in this way is a very practical as well as an economic advantage because most domestic users of this equipment do not find a programming device that requires additional wiring for the purpose of supplying power to the programmable thermostat acceptable.

A consideration of the simple series connection of a thermostat with the power supply and furnace operating relay shows that there is a 24-volt AC supply available at the thermostat when the furnace is not running and the thermostat switch is open but there is no voltage at the thermostat when the furnace is operating because there is substantially a short circuit across the thermostat.

Presently available programming devices use rechargeable batteries that are charged when the thermostat is in the "off" condition and supply power to the programming device when the thermostat is in the "on" condition. There is also available a mechanical timer that is wound by electrical power drawn from the system when the thermostat is in an "off" position. A third available alternative is a separate alternating current power source which ensures a continuity of power during the thermostat "on" periods. Of these methods, the separate AC source is costly and, for home use, is impractical because of cost. The rechargeable battery method and the electrically wound mechanical timer are also relatively costly and complex for this purpose.

It is an object of this invention to provide an improvement in a device for programming a thermostat for a furnace that is capable of drawing the power required to operate the programmer on a continuous basis at the thermostat from the two wires that lead from the power transformer and furnace operating relay. While the device will be described in connection with a furnace application, it will be appreciated that it is equally applicable to an air conditioning application.

With these and other objects in view a device according to this invention comprises a device for programming a thermostat for an AC relay operated furnace or air conditioner; a fullwave rectifier having an input connectible to the AC relay operated furnace or conditioner and having an output; a thermostat in the output of said rectifier; a thyristor in series with said thermostat; programming means for enabling said thyristor to conduct at predetermined operating times only, said programming means being responsive to pulse input signals to control said predetermined operating times, said programming means being operated by electrical energy supplied on a continuous basis from the output of said fullwave rectifier; means for supplying a trigger current to said thyristor when said thyristor is enabled and said thermostat is closed to cause said thyristor to conduct each time the voltage thereacross cyclically rises to a predetermined amount following which the voltage thereacross drops substantially to zero, whereby to provide a pulsed voltage form in the output said rectifier; the pulsed input signals of said programming means being derived from the output of said rectifier; the electrical energy to operate said programming means when said thyristor is enabled and said thermostat is closed being derived from the output of said rectifier.

FIG. 3 is an illustration of the waveform appearing across the thermostats and their associated thyristors when each of the thermostats is open and not conducting;

FIG. 4 is an illustration of the voltage waveform across the thermostats and their associated thyristors when one of the thermostats is closed and its associated thyristors is enabled to conduct current;

FIG. 6 is an illustration similar to FIG. 1 wherein Triac thyristors are used and the full wave rectifier has been inserted just prior to the power input to the programming device.

Figure 1:
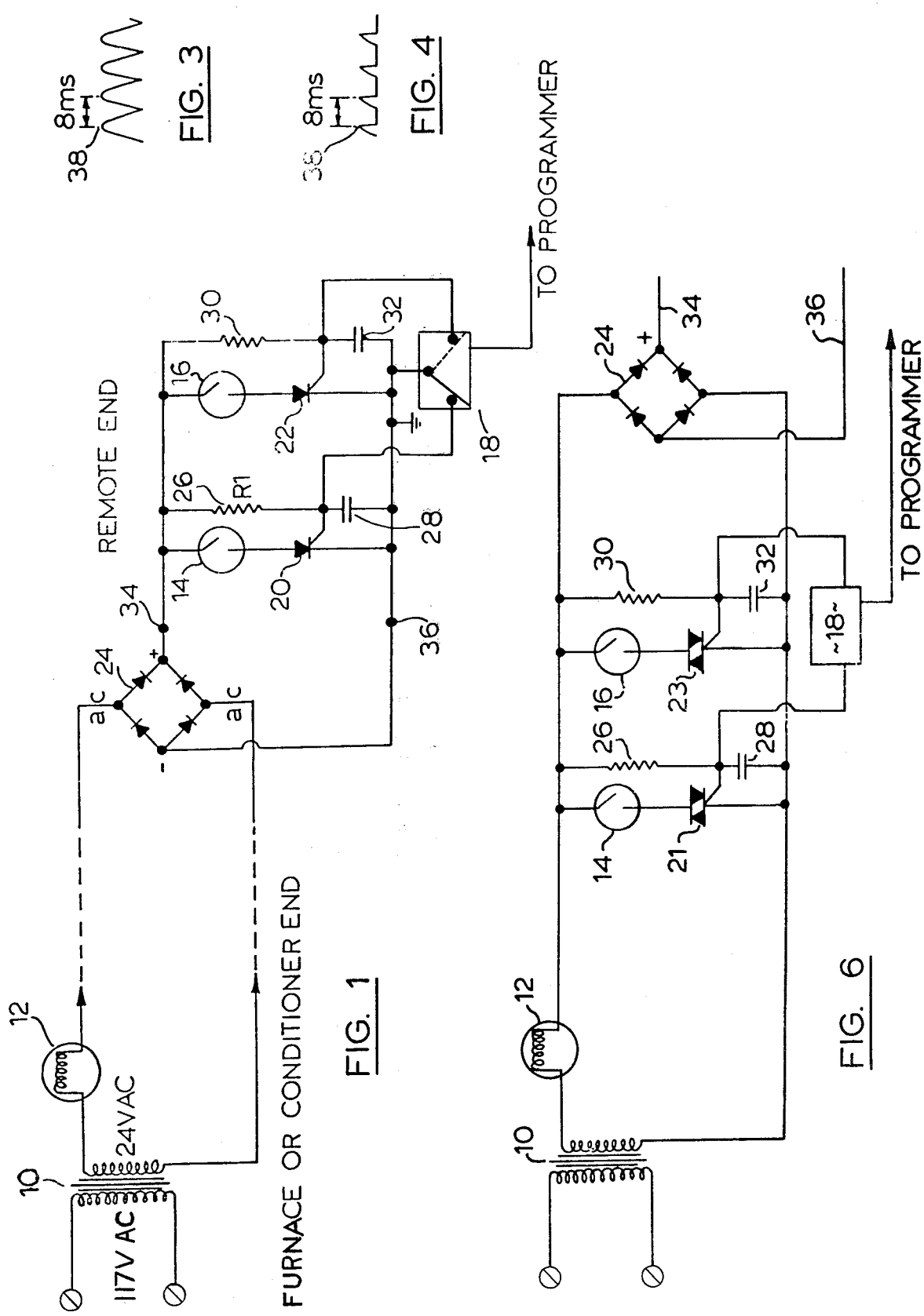
FIG. 1 is a schematic illustration of the manner in which power for operating the programmer is derived from the lines supplying power to the relay that operates the furnace.

In FIG. 1, the numeral 10 refers to an isolation transformer that steps down the conventional 117 volt AC electricity supply to 24 volts AC and the numeral 12 refers to the coil of a furnace relay that, when activated, turns the furnace on and, when not activated, turns the furnace off. The transformer 10 and the relay 12 are located at the furnace and are of conventional construction.

Remote from the furnace and located in rooms where temperature is to be controlled are thermostats 14 and 16. Thermostat 16 is enabled to control room temperature in response to the operation of a timer for certain predetermined periods of time and thermostat 16 is enabled to control room temperature in response to the operation of the timer for other predetermined periods of time. Thermostat 14 is set to initiate furnace action at a higher temperature than thermostat 16. Thus, temperature is maintained at a higher temperature for certain periods and at a lower temperature for certain other periods depending upon which thermostat is enabled by a programming device to be referred to. The armature of programming relay 18 moves in response to the operation of the programming device between the solid line position to enable thermostat 16 to control temperature and the dotted line position to enable thermostat 14 to control temperature.

Numerals 20 and 22 are silicon controlled rectifiers (SCR's) which switch thermostats 14 and 16 respectively. SCR's are themselves enabled to conduct or selected for operation by the operation of programmer relay 18. In FIG. 1 the solenoid controlled relay 18 is illustrated as short circuiting the gate of SCR 20 to ground and leaving the gate of SCR 22 open. Thus, with the gate of SCR 20 shorted it cannot conduct and it and its associated thermostat 14 is disenabled. Under this condition SCR 22 and thermostat 16 are the active elements. When the relay 18 is in the dotted line position SCR 22 and thermostat 16 are disenabled and SCR 20 and thermostat 14 are active and enabled. The position of relay 18 is controlled by a programming device as will be referred to later.

Numeral 24 is a bridge rectifier; numerals 26 and 28 refer to a resistor and condenser, respectively, for controlling the firing angle at which SCR 20 conducts and numerals 30 and 32 refer to a resistor and condenser, respectively, for controlling the firing angle at which SCR 22 conducts under circumstances where their respective thermostats are closed and they are enabled.

Thermostats 14 and 16 open when the requirement for heat (or cooling) is satisfied and closed when heat (or cooling) is required. When no heat is called for in the rooms and the low limit thermostat is enabled as representated by the solid line position of the relay the voltage waveform between the points 34 and 36 is the waveform illustrated in FIG. 3 and is the normal full wave rectified waveform having twice the frequency of the applied AC voltage at transformer 10 that one would expect at the output of bridge rectifier 24. There is no current flow to energize the relay 12.

Suppose thermostat 16 closes due to the dropping of room temperature below the temperature for which it is set. The thyristor 22 of thermostat 16 is enabled and the voltage across points 34 and 36 starts to rise as shown in FIG. 3 but it suddenly drops to zero as illustrated in FIG. 4. The trigger circuit formed by resistor 30 and condenser 32 delays the rise of voltage on the gate of the SCR 22 and the firing of SCR until the point 38 on FIG. 3.

When SCR 22 fires current flows through the SCR for the period of the horizontal part of the voltage waveform of FIG. 3 and through relay 12 to energize the relay and start the furnace. At the same time, the voltage across points 34 and 36 drops to essentially zero as illustrated in FIG. 3. When the applied voltage drops to zero SCR 16 turns off and the process repeats. The result is a spiked voltage waveform like the waveform of FIG. 3 having a frequency of twice the frequency of the power applied to transformer 10. It is usually 60 cycles per second and the fullwave rectification results in pulses 8 milliseconds apart as illustrated in FIG. 3. In between voltage pulses AC current flows through the relay 12 and maintains the relay closed to operate the furnace to which it is connected and supply heat. When sufficient heat is supplied thermostat 16 opens and current flow to thermostat 12 stops and furnace operation ceases. The waveform at points 34–36 resumes to that of FIG. 2.

Resistors 26 and 30 are very high in value and permit a negligible current flow when both thermostats are open. Under these conditions relay 12 does not operate. The current through these resistors under these conditions is only in the order of $\frac{1}{4}$ of a milliampere. This is enough to fire the SCR's when required by closing of an enabled thermostat.

Operating power for the relay 12 is not supplied over a full cycle because the SCR of the enabled closed thermostat does not fire until the peak of the waveform of FIG. 3. This is, however, a relatively short period and there is sufficient power in the alternating current through the delay 12 to operate the relay to a closed position and maintain the furnace operating as long as a thermostat is closed.

It will be apparent that with the relay 18 in the dotted line position that thermostat 14 is enabled to conduct when the temperature drops to a position that is set for closure and that, under these conditions, the circuit is completed through SCR 20 and thermostat 14 while the thermostat 16 and its thyristor 22 is disenabled.

Figure 2:
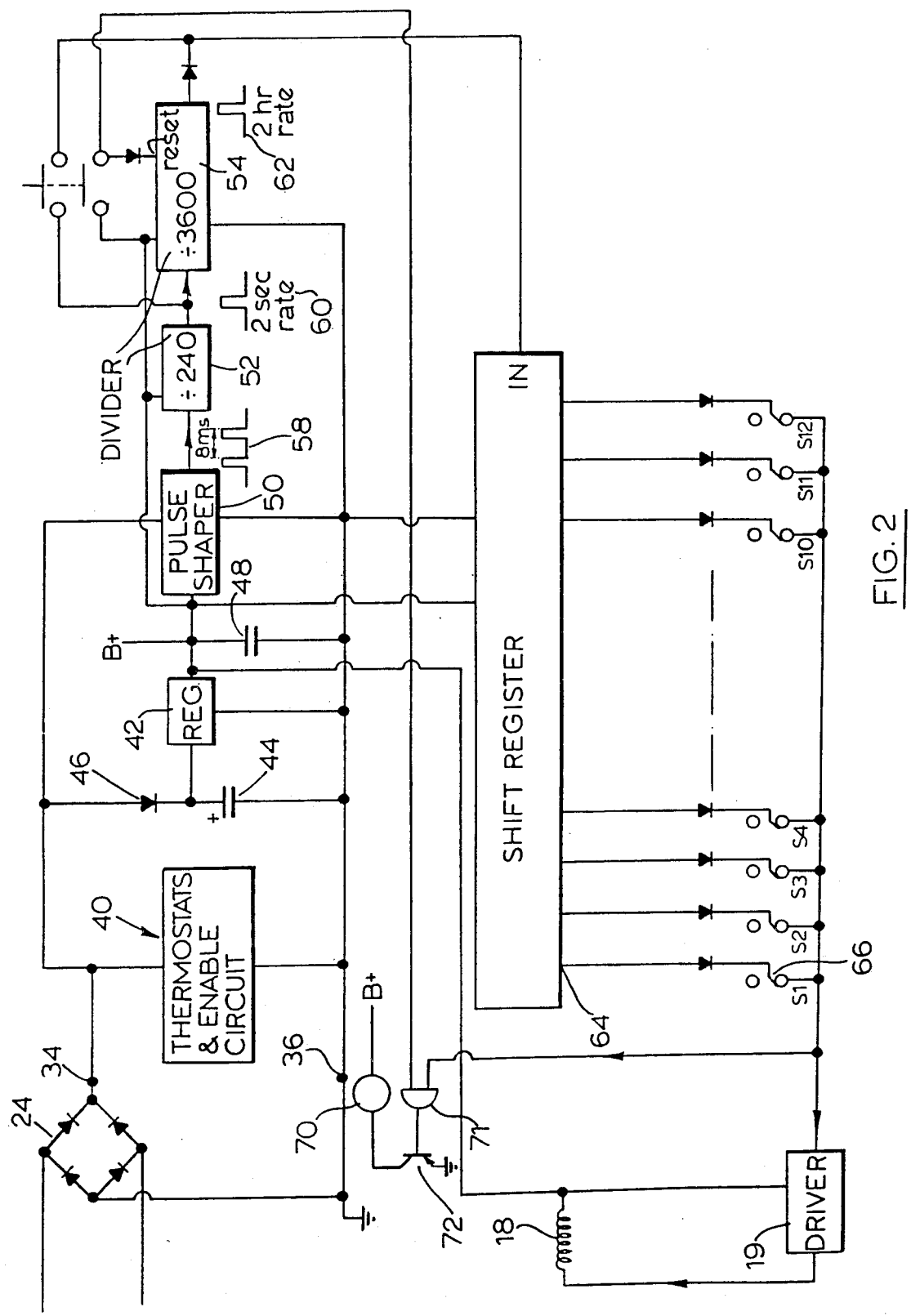
FIG. 2 is a schematic illustration of a register (including the substance of FIG. 3 schematically) for enabling one or the other of two thyristors and their respective thermostats in accordance with a preset program.

FIG. 2 is an illustration of a programming device operable from the pulsed inputs of FIGS. 3 and 4. There is a continuous voltage pulse at points 34 and 36 of an eight millisecond duration. It will be of the form of either FIG. 3 or FIG. 4 but of constant pulse rate. A pulse having a two-hour pulse rate is derived from these signals and applied to a 12 position shift register which advances one position every two hours to control furnace operation a full 24 hour period. Each one of the twelve outputs of the shift register is connected through a slide switch that is manually settable to enable either SCR 20 or SCR 22. Thus, by manual selection of the programming slide switch one can select either the high temperature thermostat 14 or the low temperature thermostat 16 in each one of 12 two hour time slots for a full day.

FIG. 1 represents what may generally be called the enabling circuit. It continuously provides a signal of constant frequency that supplies the power and clock pulses to operate a programming device for the enabling circuit. The programming device of itself is not thought to be novel. The important thing is to provide a programming device with power on a continuous basis when the thermostats are in a conducting position and when they are in a nonconducting position. FIG. 2 is a schematic illustration of a programming device wherein the enabling circuitry of FIG. 1 has been generally referred to by the numeral 40. Similar numerals in FIG. 2 to those of FIG. 1 refer to the same device.

The DC requirements for the programming device are derived from a regulator 42, the input to which is derived from the capacitor 44. Capacitor 44 is connected through rectifier 46 across the points 34 and 36 so that the capacitor 44 is charged through the rectifier 46 by either the full wave form of FIG. 3 or the partial waveform of FIG. 4. Capacitor 48 is a regulator output filter. It will be noted that the positive output of the regulator 42 connects with the pulse shaper 50, the frequency divider 52, the frequency divider 54 and the shift register 56 to supply their respective power requirements.

The waveform at points 34 and 36 is applied to the pulse shaper 50 which, at its output, transforms the original waveform into a well defined 8 millisecond clock pulse 58 that is suitable for interfacing with the remaining circuitry.

The clock pulse 58, having a rate of 120 pulses per second, is divided by 240 in the first divider block 52 to give a pulse rate of one pulse per two seconds as indicated by the numeral 60.

The pulse 60 is divided by 3600 in the divider block 54 to give one pulse every two hours as indicated by the numeral 62. It is this two hour pulse that is applied to a twelve position shift register 56 to control the relay 18. In use the pulse register 56 advances one position every two hours as determined by the application thereto of the pulse 62 whereby to control or enable one or other of the thermostats for a full 24 hour period. After 24 hours of operation the shift register resets to zero or the shift position so that the daily cycle repeats. Detail of the shift register 56 is not part of this invention since the shift register employed is a common stock item available in various forms for use with this invention.

The twelve outputs 64 of the shift register 56 each have a slide switch 66 which by its position is adapted to supply power to the relay 18 to enable or disenable either thyristor 20 or thyristor 22 during the time slot it controls the device. In one of the two positions it enables thyristor 20 for the time slot that it is operative and in the other position it enables thyristor 22 for the time slot that it is operative. It will be apparent that by setting the slide switches 66 to enable one or other of the tyristors 20 and 22 one can control the temperature with the high temperature or low temperature thermostat for each of the 12 two hour slots of the shift register.

With switches 66 closed the relay 18 is energized and occupies one of the positions illustrated in FIG. 1. With switches 66 open relay 18 is deenergized and occupies the other position of FIG. 1. Relay 18 is a low current consumption relay that gets its power from driver 19 which in turn gets power from the regulator.

Relay 18 has been illustrated as a current operated coil relay. It will be appreciated that such a relay has a substantial current drain and solid state enabling circuitry is, in fact, preferred because of the much lower current drain.

The device must be synchronized with real time in order to be effective as a domestic temperature controlling device and in this respect there is provided a setting switch 68 which, when depressed, has the effect of applying a pulse at the rate of two seconds to the shift register. It applies the wave form 60 to the pulse register and reduces the twelve stages of the pulse register from two hours in duration to two seconds in duration. In this way one can set the shift register by stepping the shift register to the appropriate time slot at the correct time. The procedure is as follows. Place all twelve programming switches 66 to the upper position. At some even hour, say 2 p.m., place the programming switch whose two hour interval begins at the selected time into the lower position. Numeral 70 is an indicator light designed to illuminate when a programming switch that is operative is in the lower position. One now presses the preset button 68 to apply two second pulses to the shift register. As soon as the shift register stage which has been set to the upper position is reached the light 70 will illuminate. Upon this occurance release the button and the shift register is set. Numeral 71 is an and gate for rendering the light 70 operative. Numeral 72 is a lamp driver.

Figure 5:
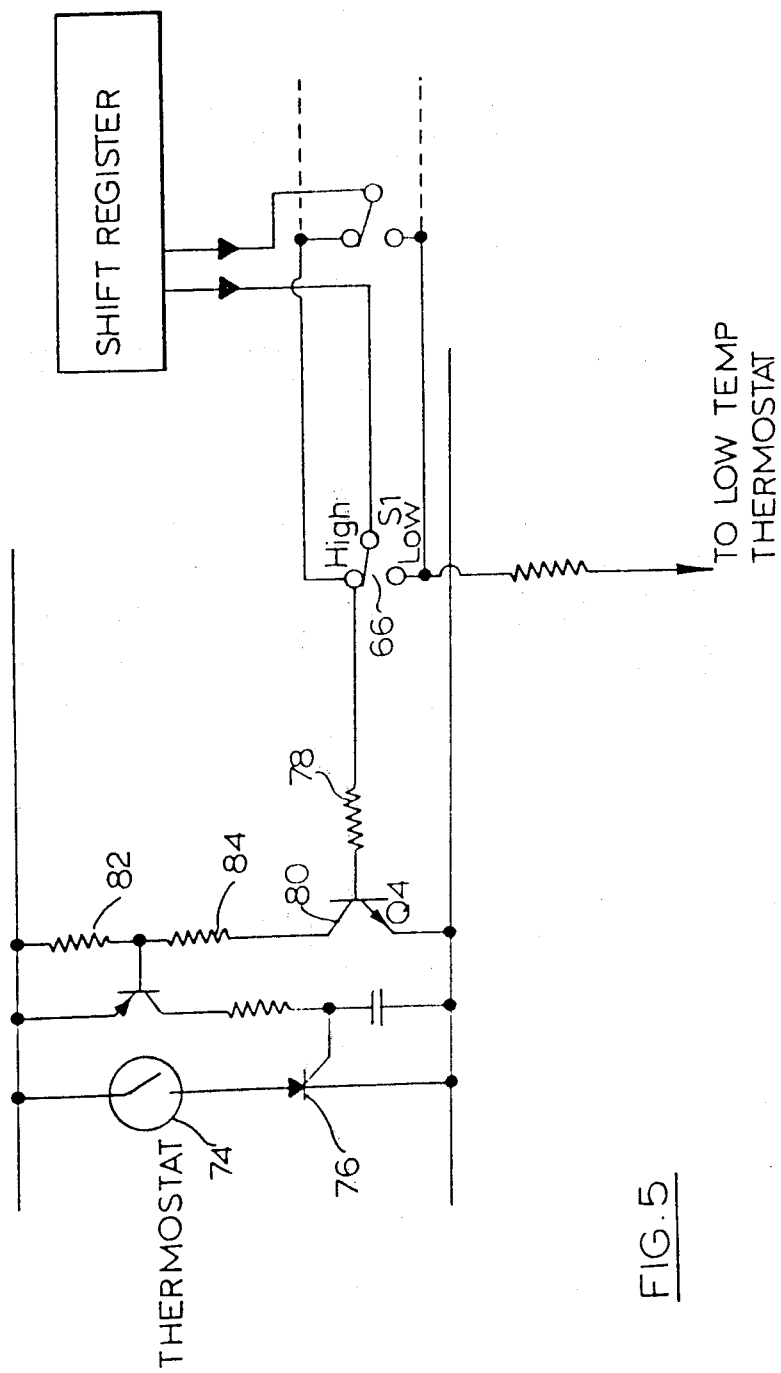
FIG. 5 is an illustration of an equivalent control circuit using solid state components.

Power requirements for the control circuit can be reduced by substituting solid state circuitry for the relay 18 and FIG. 5 is a schematic illustration of a manner of doing this.

In that Figure numeral 74 refers to the high temperature thermostat which when closed conducts through thyristor 76. In this case the shift register selection switch 66 connects through resistor 78 to the base of transistor 80. When a voltage is applied to transistor 80 voltage appears across resistors 82 and 84 and transistor 86 conducts to enable thyristor 76 to conduct when the thermostat 74 is closed. Resistor 86 and condenser 88 correspond to resistors 26 and 28 on FIG. 1.

The power requirements of the control circuit are very small and roughly in the order of 18 milliwatts. The solenoid 12 operates at 24 volts at 250 milliamperes. It, therefore, takes about 6 watts. It will be seen that one need take only very little power from the line to operate the control circuit and the power taken for control purposes does not affect satisfactory operation of the furnace solenoid.

Modifications of the invention herein disclosed will be apparent to those skilled in the art and it is not intended that the described embodiments of the invention should be read in a limiting way.

An important feature of the device is the supply of power to the programming device to operate its switching means that enables and disenables the thyristors and divides time to time slots. Power is supplied from a voltage taken across the thyristors whether they are conducting or not. To obtain sufficient power when the thermostats are closed the firing angle of the thyristors is delayed so that there is sufficient power in the wave form of FIG. 4 for the programming device and also sufficient power in the energy that passes through the control current paths of the thyristors to control operation of the furnace, air conditioner or the like. The power of the applied wave form is divided to achieve the two functions.

The use of a full wave rectifier 24 provides power to the programming means twice each cycle of AC power supplied and doubles the power available for control purposes. In the case of the silicon controlled rectifier thyristor of FIG. 1 the full wave rectifier 24 must be located in advance of the thyristors 20 and 22 because the thyristors can conduct in only one direction.

It is well known, however, that the Triac thyristor can conduct in both directions and if Triac thyristors are substituted for the tyristors 20 and 22 one can pass alternating current through the thyristor control current path and locate the full wave rectifier after the thermostat thyristor combination but before the programming means. FIG. 6 is an illustration of such a circuit wherein the Triac thyristors are indicated by numerals 21 and 23. The numerals representing the other parts of the combination refer to similar parts to FIG. 1.

While it is obviously preferred to use a full wave rectifier in order to obtain maximum power for the programming device one does not necessarily have to use a full wave rectifier. Power for the programming means could be taken from the half wave positive voltage pulse of the operating power supply across the thyristors, but only one half of the available power would be supplied to the programming means.

Other modifications to the illustrated circuits will be apparent. For example, the thermostat switches need not be in the anode-cathode control current path of the thyristors. They could with equal effect be in the gate of their respective thyristor.

Embodiments of the invention other than the ones illustrated will be apparent to those skilled in the art.

What I claim as my invention is:

1. In a device for controlling the AC energization of a furnace, air conditioner or the like
    two control current paths each including a thyristor for the flow of current to control energization of a furnace, air conditioner or the like;
    a manually settable programming device operable on a continuous basis from voltage across said thyristors;
    each of said thyristors having a thermostat switch adapted to close on achievement of a predetermined temperature associated therewith;
    said programming device being adapted to divide time into time slots and having a switching means;
    said thyristor of each of said control current paths having control gate;
    said switching means being connected to said control gate to enable the thyristor of a selected one of said control current paths to conduct when its respective thermostat is closed and to disenable the thyristor of the other of said control current paths from conducting in any predetermined time slot;
    means for controlling the firing angle of each of said thyristors when it is both enabled by said programming means and its respective thermostat switch is closed to permit, in each cycle, the supply of voltage to operate said manually settable programming device before it fires and the flow of current in its respective control current path to control energization of a furnace, air conditioner or the like after it fires.

2. In a device for controlling the AC energization of a furnace, air conditioner or the like as claimed in claim 1 having a full wave rectifier for voltage supplied to operate said programming device.

3. In a device for controlling the AC energization of a furnace, air conditioner or the like as claimed in claim 2 in which said full wave rectifier is in advance of said energization paths and said thyristors are silicon controlled rectifiers.

4. In a device for controlling the AC energization of a furnace, air conditioner or the like as claimed in claim 2 in which said thyristors are Triacs and said full wave rectifier is between said thyristors and said programming device. is between said thyristors and said programming device.

* * * * *